United States Patent
Liu et al.

(10) Patent No.: US 12,143,986 B2
(45) Date of Patent: Nov. 12, 2024

(54) INFORMATION SENDING METHOD AND APPARATUS, INFORMATION RECEIVING METHOD AND APPARATUS, BASE STATION, TERMINAL, AND COMMUNICATION SYSTEM

(71) Applicant: ZTE Corporation, Guangdong (CN)

(72) Inventors: Kun Liu, Guangdong (CN); Bo Dai, Guangdong (CN); Weiwei Yang, Guangdong (CN); Huiying Fang, Guangdong (CN); Luanjian Bian, Guangdong (CN); Youjun Hu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 375 days.

(21) Appl. No.: 17/381,783

(22) Filed: Jul. 21, 2021

(65) Prior Publication Data

US 2022/0007397 A1     Jan. 6, 2022

Related U.S. Application Data

(63) Continuation of application No. PCT/CN2020/073227, filed on Jan. 20, 2020.

(30) Foreign Application Priority Data

Jan. 21, 2019    (CN) .......................... 201910054154.1

(51) Int. Cl.
*H04W 72/1273*     (2023.01)
*H04L 1/1812*      (2023.01)
(Continued)

(52) U.S. Cl.
CPC ....... *H04W 72/1273* (2013.01); *H04L 1/1819* (2013.01); *H04L 1/1896* (2013.01);
(Continued)

(58) Field of Classification Search
None
See application file for complete search history.

(56) References Cited

U.S. PATENT DOCUMENTS 10,136,381 B2    11/2018   Martin et al.
10,334,525 B1*    6/2019   Govindassamy ..........................
                                        H04W 52/0219
(Continued)

FOREIGN PATENT DOCUMENTS

CN          101808408 A     8/2010
CN          105580487 A     5/2016
(Continued)

OTHER PUBLICATIONS

Canadian Office Action issued in CA Patent Application No. 3,127,397, dated Apr. 11, 2023, 5 pages.
(Continued)

*Primary Examiner* — Andrew C Oh
(74) *Attorney, Agent, or Firm* — Perkins Coie LLP

(57) ABSTRACT

Provided are an information sending method and apparatus, an information receiving method and apparatus, a base station, a terminal, and a communication system. The base station sends uplink transmission configuration information to the terminal. The uplink transmission configuration information includes configuration information of an uplink channel resource and/or configuration information of a downlink control channel search space. Information carried in a downlink control channel of the downlink control channel search space includes downlink control information (DCI). In this manner, the terminal can detect the DCI sent by the base station and a downlink transmission between the base station and the terminal is implemented. Therefore, through the indication of the uplink transmission configuration information, information transmission can be smoothly implemented no matter whether the terminal is in (Continued)

an RRC-CONNECT state or an RRC-IDLE state. Naturally, when the terminal is in the RRC-IDLE state, data transmission can be completed without state switching, thus reducing power consumption and resource consumption caused by state switching of the terminal, being beneficial to achieving optimal configuration of terminal resources, and enhancing user experience at the terminal side.

8 Claims, 7 Drawing Sheets

(51) Int. Cl.
*H04L 1/1867* (2023.01)
*H04W 56/00* (2009.01)
*H04W 68/00* (2009.01)
*H04W 72/0446* (2023.01)
*H04W 72/23* (2023.01)

(52) U.S. Cl.
CPC ....... *H04W 56/005* (2013.01); *H04W 68/005* (2013.01); *H04W 72/0446* (2013.01); *H04W 72/23* (2023.01)

(56) References Cited

U.S. PATENT DOCUMENTS

| | | | |
|---|---|---|---|
| 10,925,027 B2 | 2/2021 | Liu et al. | |
| 11,089,618 B2 | 8/2021 | Liu et al. | |
| 11,337,212 B2* | 5/2022 | Shimezawa | H04L 5/001 |
| 11,432,237 B2 | 8/2022 | Yu et al. | |
| 2012/0014371 A1* | 1/2012 | Weng | H04J 3/0682 370/350 |
| 2012/0082088 A1* | 4/2012 | Dalsgaard | H04W 74/0833 370/315 |
| 2013/0034072 A1* | 2/2013 | Kim | H03M 13/6536 370/329 |
| 2014/0162705 A1* | 6/2014 | De Wit | H04W 4/20 455/458 |
| 2014/0348090 A1* | 11/2014 | Nguyen | H04W 72/23 370/329 |
| 2014/0369242 A1* | 12/2014 | Ng | H04L 5/001 370/280 |
| 2017/0048828 A1* | 2/2017 | Um | H04L 1/0061 |
| 2017/0273078 A1* | 9/2017 | Rico Alvarino | H04W 76/11 |
| 2017/0325277 A1 | 11/2017 | Fujishiro et al. | |
| 2017/0367069 A1* | 12/2017 | Agiwal | H04W 68/005 |
| 2017/0374646 A1 | 12/2017 | Takeda et al. | |
| 2018/0049247 A1* | 2/2018 | Park | H04W 4/06 |
| 2018/0145796 A1 | 5/2018 | Liang et al. | |
| 2018/0295616 A1 | 10/2018 | Yang et al. | |
| 2019/0150125 A1* | 5/2019 | Bagheri | H04L 1/0072 370/336 |
| 2019/0223197 A1* | 7/2019 | Shin | H04L 1/0031 |
| 2021/0153162 A1* | 5/2021 | Chen | H04W 56/001 |
| 2022/0078737 A1* | 3/2022 | Takeda | H04W 56/0045 |

FOREIGN PATENT DOCUMENTS

| | | | | |
|---|---|---|---|---|
| CN | 107211413 A | | 9/2017 | |
| CN | 107995636 A | | 5/2018 | |
| CN | 108307495 A | | 7/2018 | |
| CN | 109246826 A | | 1/2019 | |
| CN | 110050501 A | * | 7/2019 | ............. H04J 11/00 |
| CN | 110121906 A | * | 8/2019 | ........ H04W 56/0045 |
| CN | 110536425 A | * | 12/2019 | |
| CN | 110536434 A | | 12/2019 | |
| CN | 111357343 A | * | 6/2020 | ........... H04L 12/189 |
| CN | 111656829 A | * | 9/2020 | ............ H04W 68/02 |
| CN | 106470393 B | * | 2/2021 | ............. H04B 1/713 |
| EP | 3821676 A1 | | 5/2021 | |
| RU | 2643349 C1 | | 2/2018 | |
| WO | WO-2011129650 A2 | * | 10/2011 | ........ H03M 13/3738 |
| WO | WO-2012041422 A2 | * | 4/2012 | ............... H04B 3/36 |
| WO | WO-2012119626 A1 | * | 9/2012 | ............... H04B 3/36 |
| WO | 2015116865 A1 | | 8/2015 | |
| WO | WO-2017173038 A1 | * | 10/2017 | ........... H04L 1/0045 |
| WO | WO-2017174469 A1 | * | 10/2017 | .............. H04W 4/70 |
| WO | 2018103558 A1 | | 6/2018 | |
| WO | 2018172896 A1 | | 9/2018 | |
| WO | 2018182385 A1 | | 10/2018 | |
| WO | 2018/213152 A1 | | 11/2018 | |
| WO | 2020032659 A1 | | 2/2020 | |
| WO | WO-2020061954 A1 | * | 4/2020 | ........ H04W 52/0229 |
| WO | WO-2020061958 A1 | * | 4/2020 | ............ H04W 68/00 |

OTHER PUBLICATIONS

International Search Report and Written Opinion mailed on Apr. 15, 2020 for International Application No. PCT/CN2020/073227, filed on Jan. 20, 2020 (10 pages).
ZTE, "Support for transmission in preconfigured UL resources for MTC," 3GPP TSG RAN WG1 Meeting#96, Athens, Greece, R1-1901858, 13 pages, Feb. 25-Mar. 1, 2019.
European Search Report for EP Patent Application No. 20745671.6, dated Oct. 6, 2022, 11 pages.
Huawei et al., "Further topics for transmission in preconfigured UL resources," 3GPP TSG RAN WG1 Meeting #95, R1-1813762, Spokane, USA, Nov. 12-16, 2018, 14 pages.
Institute for Information Industry (III), "Discussion on transmission in preconfigured UL resources," 3GPP TSG RAN WG1 Meeting #95, R1-1813529, Spokane, USA, Nov. 12-16, 2018, 4 pages.
Chinese Notification to Complete Formalities of Registration issued in CN Patent Application No. 202210500843.2, dated May 16, 2023, 7 pages. English translation included.
NEC, "[Resubmitted] Updates to Small Data Transmission from RRC Idle Mode solution," SA WG2 Temporary Document, SA WG2 Meeting #98, S2-132472, Jul. 15-19, 2013, Valencia, Spain, 8 pages.
Chinese Office Action issued in CN Patent Application No. 202210500843.2, dated Feb. 14, 2023, 11 pages. English translation included.
Russian Decision on Grant issued in RU Patent Application No. 2021124674, dated Jan. 9, 2023, 15 pages. English translation included.
Indonesian office action issued in ID Patent Application No. P00202106498, dated Nov. 21, 2023, 6 pages. English translation included.
European Communication pursuant to Article 94(3) EPC issued in EP Patent Application No. 20745671.6, dated May 16, 2024, 6 pages.
Sierra Wireless, "Pre-configured UL Resources Design Considerations," 3GPP TSG RAN WG2 Meeting #103bis, R2-1815078, Chengdu, China, Oct. 8-12, 2018, 8 pages.
Canadian notice of allowance issued in CA Patent Application No. 3,127,397, dated Mar. 7, 2024, 1 page.
Korean office action issued in KR Patent Application No. 10-2021-7026619, dated Jul. 23, 2024, 5 pages. English translation included.

* cited by examiner

INFORMATION SENDING METHOD AND APPARATUS, INFORMATION RECEIVING METHOD AND APPARATUS, BASE STATION, TERMINAL, AND COMMUNICATION SYSTEM

CROSS-REFERENCE TO RELATED APPLICATIONS

This application is a continuation of and claims priority to International Patent Application No. PCT/CN2020/073227, filed on Jan. 20, 2020, which claims priority to Chinese Patent Application No. 201910054154.1, filed on Jan. 21, 2019, the contents of each of which are incorporated herein by reference in their entireties.

TECHNICAL FIELD

The present application relates to the field of communication and, in particular, to an information sending method and apparatus, an information receiving method and apparatus, a base station, a terminal, and a communication system.

BACKGROUND

Currently, a terminal is required to enter a radio resource control connect (RRC-CONNECT) state from a radio resource control idle (RRC-IDLE) state before sending or receiving data. However, system resources will be consumed and power consumption of the terminal will be increased when the terminal enters the RRC-CONNECT state from the RRC-IDLE state. Therefore, a new data transmission method needs to be provided to solve this problem.

SUMMARY

The information sending method and apparatus, the information receiving method and apparatus, the base station, the terminal, and the communication system in the embodiments of the present disclosure mainly provide a new information transmission solution to enable the terminal to support an uplink data transmission in an RRC-IDLE state so as to solve the preceding technical problem.

To solve the preceding technical problem, an embodiment of the present disclosure provides an information sending method. The method includes the steps described below.

Uplink transmission configuration information is sent to a terminal, where the uplink transmission configuration information includes at least one of: configuration information of an uplink channel resource or configuration information of a downlink control channel search space. Where information carried in a downlink control channel of the downlink control channel search space includes downlink control information (DCI).

An embodiment of the present disclosure further provides an information receiving method. The method includes the steps described below.

Uplink transmission configuration information sent by a base station is received, where the uplink transmission configuration information includes at least one of: configuration information of an uplink channel resource or configuration information of a downlink control channel search space. Where information carried in a downlink control channel of the downlink control channel search space includes DCI.

An embodiment of the present disclosure further provides an information sending apparatus. The apparatus includes a sending module.

The sending module is configured to send uplink transmission configuration information to a terminal. The uplink transmission configuration information includes at least one of: configuration information of an uplink channel resource or configuration information of a downlink control channel search space. Where information carried in a downlink control channel of the downlink control channel search space includes DCI.

An embodiment of the present disclosure further provides an information receiving apparatus.

The apparatus includes a receiving module.

The receiving module is configured to receive uplink transmission configuration information sent by a base station. The uplink transmission configuration information includes at least one of: configuration information of an uplink channel resource or configuration information of a downlink control channel search space. Where information carried in a downlink control channel of the downlink control channel search space includes DCI.

An embodiment of the present disclosure further provides a base station. The base station includes a first processor, a first memory, and a first communication bus.

The first communication bus is configured to enable connection and communication between the first processor and the first memory.

The first processor is configured to execute one or more programs stored in the memory to implement steps of the information sending method described above.

An embodiment of the present disclosure further provides a terminal. The terminal includes a second processor, a second memory, and a second communication bus.

The second communication bus is configured to enable connection and communication between the second processor and the second memory.

The second processor is configured to execute one or more programs stored in the memory to implement steps of the information receiving method described above.

An embodiment of the present disclosure further provides a communication system. The communication system includes the base station described above and at least one terminal described above.

An embodiment of the present disclosure further provides a readable storage medium. The storage medium stores an information sending program and/or an information receiving program. The information sending program is executable by one or more processors to implement the steps in the information sending method described above. The information receiving program is executable by one or more processors to implement the steps in the information receiving method described above.

The present application has the beneficial effects described below.

According to the information sending method and apparatus, the information receiving method and apparatus, the base station, the terminal, and the communication system provided in the embodiments of the present disclosure, the base station sends uplink transmission configuration information to the terminal. The uplink transmission configuration information includes configuration information of an uplink channel resource and/or configuration information of a downlink control channel search space. Information carried in a downlink control channel of the downlink control channel search space includes DCI. The configuration information of the uplink channel resource in the uplink transmission configuration information sent by the base station can indicate the uplink channel to the terminal to help the terminal implement the uplink transmission. Moreover, the configuration information of the downlink control channel search space in the uplink transmission configuration information can indicate the downlink control channel search space to the terminal, so that the terminal can detect the DCI sent by the base station and the downlink transmission between the base station and the terminal is implemented. Therefore, through the indication of the uplink transmission configuration information, information transmission can be smoothly implemented no matter whether the terminal is in the RRC-CONNECT state or the RRC-IDLE state. Naturally, when the terminal is in the RRC-IDLE state, data transmission can be completed without state switching, thus reducing power consumption and resource consumption caused by state switching of the terminal, being beneficial to achieving optimal configuration of terminal resources, and enhancing user experience on the terminal side.

Other features of the present application and the corresponding beneficial effects are set forth later in the description, and it is to be understood that at least part of the beneficial effects become apparent from the description of the present application.

DETAILED DESCRIPTION

To illustrate the objects, technical solutions and advantages of the present application clearer, the embodiments of the present disclosure are further described below in detail through embodiments in conjunction with drawings. It is to be understood that the embodiments described herein are merely intended to explain the present application and are not intended to limit the present application.

Embodiment One

With the development of smart terminals and the enrichment of wireless data application services, the number of data users in a wireless communication network has increased greatly, wireless data content is no longer limited to traditional texts or images, and more and more multimedia services such as high-definition videos and mobile TVs are emerging, resulting in an explosive growth of wireless communication network traffic. The mobile Internet and the Internet of Things will become a main driving force for mobile communication development.

For the Internet of Things, the 3rd Generation Partnership Project (3GPP) standard organization has developed two representative communication standard protocols: the Machine Type Communication (MTC) and the Narrow Band Internet of Things (NB-IoT). For the mobile Internet, the 3GPP standard organization has recently developed the 5G New Radio (NR) communication standard protocol. According to the preceding communication standard protocol, the terminal enters an RRC-IDLE state when no data is to be sent or received so as to reduce the power consumption of the terminal. According to the preceding communication standard protocol, the terminal is required to switch from the RRC-IDLE state to the RRC-CONNECT state before sending or receiving data and then transmit data.

System resource consumption and power consumption will be generated when the terminal enters the RRC-CONNECT state from the RRC-IDLE state. The power consumption and resource consumption caused by state switching are particularly significant in Internet of Things applications. The volume of data transmitted by the terminal in the Internet of Things is not large, but the transmission process may be performed periodically, which leads to more power consumption and resource consumption due to RRC state switching each time the terminal transmits a small volume of data, thus affecting the terminal performance and standby duration and reducing the user experience at the terminal side.

Figure 1:
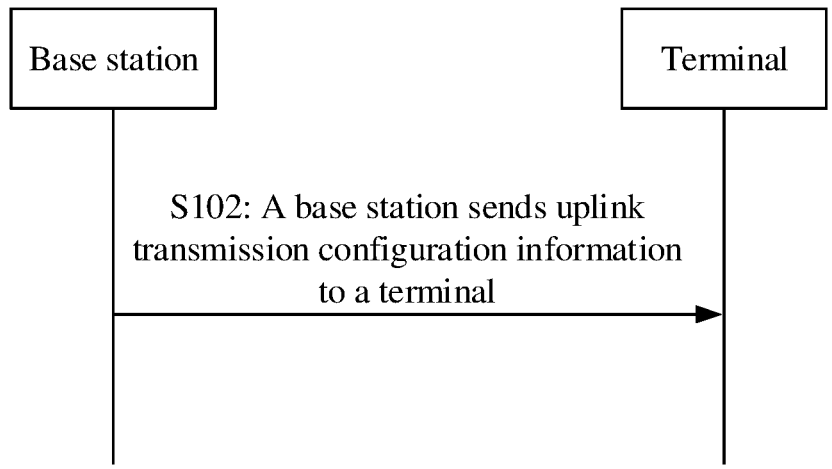
FIG. 1 is a flowchart showing interaction between a base station and a terminal in an information transmission solution according to embodiment one of the present disclosure.

To solve the preceding problem, the embodiment provides an information sending method and an information receiving method. The information sending method is applied to a base station side, and the information receiving method is applied to a terminal side. Please refer to a flowchart showing interaction between a base station and a terminal shown in FIG. 1.

In S102, a base station sends uplink transmission configuration information to a terminal.

The terminal will receive the uplink transmission configuration information sent by the base station. In the embodiment, the uplink transmission configuration information includes at least one of the two following types of information: (1) configuration information of an uplink channel resource; or (2) configuration information of a downlink control channel search space.

In some examples of the embodiment, the uplink transmission configuration information includes merely one of the preceding two types of information, while in some other examples of the embodiment, the uplink transmission configuration information may include both the preceding two types of configuration information. In the embodiment, the uplink transmission configuration information may be used for indicating that the terminal is to perform an uplink transmission in the RRC-CONNECT state or indicating that the terminal is to perform an uplink transmission in the RRC-IDLE state. Therefore, in the embodiment, the terminal does not need to switch from the RRC-IDLE state to the RRC-CONNECT state even if the terminal needs to perform an uplink data transmission in the RRC-IDLE state, avoiding various signaling interactions required in a state switching process, thereby avoiding power consumption and system resource consumption generated by the terminal in a state switching signaling exchange process, and being beneficial to the optimal configuration of terminal resources.

In some examples of the embodiment, the base station and the terminal may agree that both the uplink transmission by the terminal in the RRC-IDLE state and the uplink transmission by the terminal in the non-idle state can be implemented through the configuration of the uplink transmission configuration information. In some other examples of the embodiment, the base station may set an idle transmission indication identifier in the uplink transmission configuration indication information and use the idle transmission indication identifier to indicate whether the terminal can perform an uplink transmission in the RRC-IDLE state.

If the uplink transmission configuration information includes the preceding first type of configuration information, that is, the configuration information of the uplink channel resource, the base station may indicate the uplink channel resource to the terminal through the configuration information. The uplink channel configured through the configuration information of the uplink channel resource may be a resource specific to the terminal having received the uplink transmission configuration information. Of course, in some other cases, the uplink channel configured through the configuration information of the uplink channel resource may also be a resource common to a group of terminals (the number of terminals is greater than one).

It is to be understood that uplink channel resources configured through the configuration information of the uplink channel resources can be continuously distributed or discretely distributed, for example, periodically distributed, in the time domain.

If the uplink transmission configuration information includes the preceding second type of configuration information, that is, the configuration information of the downlink control channel search space, the configuration information may indicate the downlink control channel search space to the terminal.

In the embodiment, the configuration information of the downlink control channel search space includes at least one of the following: 1) time domain position information of the downlink control channel search space; 2) frequency domain position information of the downlink control channel search space; or 3) distribution information of downlink control channels in the downlink control channel search space.

Downlink control channel search spaces configured through the configuration information of the downlink control channel search spaces may be continuously distributed or discretely distributed, for example, periodically distributed, in the time domain.

When the uplink channel configured through the configuration information of the uplink channel resource is a resource dedicated to a certain terminal, the downlink control channel search space configured through the configuration information of the downlink control channel search space is also dedicated to the terminal. Correspondingly, when the uplink channel configured through the configuration information of the uplink channel resource is a resource common to a group of terminals, the downlink control channel search space configured through the configuration information of the downlink control channel search space is also common to the group of terminals.

In some examples of the embodiment, the uplink transmission configuration information includes at least one of the configuration information of the uplink channel resource and the configuration information of the downlink control channel search space and may further include (3) configuration information of a physical random access channel (PRACH).

The configuration information of the physical random access channel includes at least one of: 1) configuration information of a time-frequency resource occupied by the physical random access channel; or 2) configuration information of a random access signal sent on the physical random access channel.

When the uplink transmission configuration information includes the configuration information of the physical random access channel and the configuration information of the uplink channel resource, the uplink transmission may be understood as sending uplink data when the random access signal is sent, and the uplink transmission may also be understood as the transmission of the random access signal carrying the uplink data in the 5GNR system.

In the embodiment, one downlink control channel search space corresponds to at least one uplink channel, and in some examples, each uplink channel resource corresponds to one downlink control channel search space. It is to be understood that the information carried in the downlink channel of the downlink control channel search space includes DCI. In some examples, the DCI may include at least one of the following types of information: first scheduling information; second scheduling information; information about a hybrid automatic repeat request-acknowledgement (HARQ-ACK) of data sent in an uplink channel; uplink transmission power adjustment information; first indication information; an uplink grant (UL grant); timing advanced (TA) update information; resource configuration information of the acknowledgement information for the DCI; or a downlink grant (DL grant).

The information that may be carried in the DCI is described below.

For first scheduling information, in some examples of the embodiment, when the first condition is satisfied, the base station sends, in the downlink control channel search space indicated by the configuration information of the downlink control channel search space, first scheduling information used for indicating a downlink data transmission so that the terminal receives downlink data according to the first scheduling information.

Figure 2:
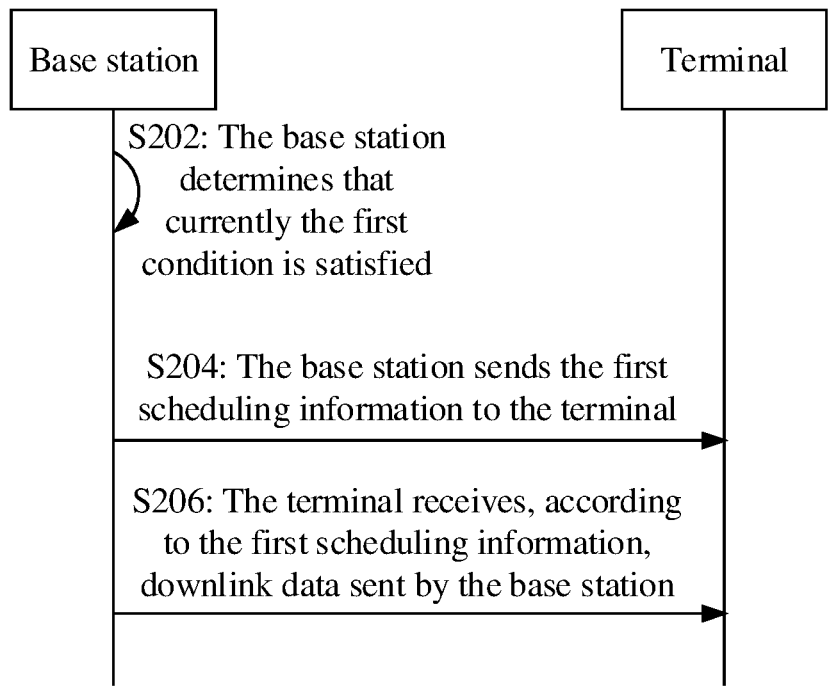
FIG. 2 is a flowchart showing another interaction between a base station and a terminal in an information transmission solution according to embodiment one of the present disclosure.

Please refer to a flowchart showing interaction between a terminal and a base station shown in FIG. 2.

In S202, the base station determines that currently the first condition is satisfied.

In S204, the base station sends the first scheduling information to the terminal.

In S206, the terminal receives, according to the first scheduling information, downlink data sent by the base station.

As can be seen from FIG. 2, the terminal will also receive the first scheduling information sent by the base station when the first condition is satisfied and receive downlink data according to the first scheduling information.

In some examples, the first scheduling information may be a paging message sent by the base station to the terminal, and the downlink data transmitted on the downlink channel indicated by the first scheduling information is the downlink data indicated to the terminal by the paging message. The first scheduling information may include at least one of configuration information of the downlink channel, the modulation order of downlink data to be transmitted, or indication information of the size of a transmission data block.

The first condition includes at least one of the conditions described below.

Condition one: the downlink control channel search space at least partially overlaps a paging transmission window (PTW).

Condition two: the downlink control channel of the downlink control channel search space at least partially overlaps a PTW.

Condition three: the TA of the terminal is in a valid state. The terminal here refers to the target terminal to which the base station sends the paging message. The base station needs to be able to determine that the timing advance of the target terminal is in the valid state.

It is to be understood that "at least partially overlapping" refers to that an overlap exists, for example, the downlink control channel search space at least partially overlapping the PTW may be that the downlink control channel search space completely overlaps or partially overlaps the PTW. Similarly, the downlink control channel at least partially overlapping the PTW may also be that the downlink control channel completely overlaps or partially overlaps the PTW.

In some other examples of the embodiment, in addition to at least one of the preceding three conditions, the first condition further includes condition four.

Condition four: the base station has detected, in an uplink channel corresponding to the downlink control channel search space, that the terminal has performed a data transmission.

Therefore, condition four is that the terminal has performed a data transmission to the base station on the uplink channel corresponding to the downlink control channel search space.

In some examples of the embodiment, when it is determined that the first condition is satisfied, the base station and the terminal may perform operations in a manner with reference to one of the two example manners described below. The two example manners are described below separately.

First Example

The base station performs operations in several manners described below.

1) The base station does not send a paging message on a paging occasion (PO) in the PTW. That is, the base station sends a paging message on none of the POs in the PTW.

2) In a case where a PO in the PTW at least partially overlaps the downlink control channel search space, the base station does not send a paging message on the PO.

3) In a case where a PO in the PTW at least partially overlaps a downlink control channel of the downlink control channel search space, the base station does not send a paging message on the PO.

4) In a case where a time domain interval between a PO in the PTW and a downlink control channel of the downlink control channel search space is less than or equal to a first threshold, the base station does not send a paging message on the PO. The first threshold here may be configured by the base station or the network and then sent to the terminal or may be the value in the default configuration.

Correspondingly, in the case where the first condition is satisfied, the terminal performs at least one of the operations described below.

1) A paging message is not detected on a PO in the PTW, that is, the terminal detects a paging message on none of the POs in the PTW.

2) In a case where a PO in the PTW at least partially overlaps the downlink control channel search space, the terminal does not detect a paging message on the PO.

3) In a case where a PO in the PTW at least partially overlaps a downlink control channel of the downlink control channel search space, the terminal does not detect a paging message on the PO.

4) In a case where a time domain interval between a PO in the PTW and a downlink control channel of the downlink control channel search space is less than or equal to a first threshold, the terminal does not detect a paging message on the PO.

It is to be understood that the operation manner of the terminal corresponds to the operation manner of the base station. If the base station performs operation 1), the terminal also performs operation 1); and if the base station performs an operation in manner 4), the terminal also performs an operation in manner 4).

It is to be noted that "a PO" involved in several operation manners here does not specifically refer to a certain PO but refers to all POs in the PTW that satisfy a corresponding condition. For example, the PO described in manner 2) where the base station does not send the paging message refers to all POs in the PTW that at least partially overlap the downlink control channel search space. Similarly, the PO described in manner 3) where the base station does not send the paging message refers to all POs that at least partially overlap the downlink control channel of the downlink control channel search space.

Second Example

In some other examples of the embodiment, when it is determined that the first condition is satisfied, the base station side may perform an operation in the manners described below.

(1) The base station sends a paging message on a PO in the PTW. That is, the base station sends a paging message on all of the POs in the PTW.

(2) In a case where a PO in the PTW does not overlap the downlink control channel search space, the base station sends a paging message on the PO.

(3) In a case where a PO in the PTW does not overlap a downlink control channel of the downlink control channel search space, the base station sends a paging message on the PO.

(4) In a case where a time domain interval between a PO in the PTW and a downlink control channel of the downlink control channel search space is greater than or equal to a second threshold, the base station sends a paging message on the PO. The second threshold here may be configured by the base station or the network and then sent to the terminal or may be the value in the default configuration. It is to be understood that the values of the second threshold and the first threshold may be the same or different.

Correspondingly, in the case where the first condition is satisfied, the terminal performs at least one of the operations described below.

(1) The terminal detects a paging message on a PO in the PTW. That is, the terminal detects a paging message on all of the POs in the PTW.

(2) In a case where a PO in the PTW does not overlap the downlink control channel search space, the terminal detects a paging message on the PO.

(3) In a case where a PO in the PTW does not overlap a downlink control channel of the downlink control channel search space, the terminal detects a paging message on the PO.

(4) In a case where a time domain interval between a PO in the PTW and a downlink control channel of the downlink control channel search space is greater than or equal to a second threshold, the terminal detects a paging message on the PO.

The second example is similar to the first example, and the operation manner of the terminal also corresponds to the operation manner of the base station. Similarly, in the second example, "a PO" in several operation manners does not specifically refer to a certain PO but refers to all POs in the PTW that satisfy a corresponding condition.

For second scheduling information, in some examples of the embodiment, the base station sends second scheduling information in a downlink control channel search space, and the DCI carrying the second scheduling information is scrambled by a terminal-specific radio network temporary identifier (RNTI). In the embodiment, the base station sending the second scheduling information in the downlink control channel search space is independent of whether the preceding first condition is satisfied, that is, in this example, the first condition is required to be satisfied when the base station sends the first scheduling information to the terminal, but the first condition is not required to be satisfied when the base station sends the second scheduling information to the terminal. The second scheduling information is used for indicating, to the terminal, the transmission of downlink data. The terminal detects, in the downlink control channel search space, the second scheduling information for sending downlink data. Subsequently, the base station sends the downlink data to the terminal on the downlink channel indicated by the second scheduling information for the terminal to receive.

It is to be understood that after the terminal detects the downlink data sent by the base station according to the second scheduling information, the terminal may correctly receive the downlink data or may fail to receive the downlink data. Therefore, in some examples, when the terminal fails to detect the downlink data sent by the base station, the terminal may send negative acknowledgement (NACK) indication information representing the failure of data reception to the base station. When the base station receives the NACK indication information for the downlink data sent by the terminal, the base station can send retransmission scheduling information for the downlink data in a first downlink control channel search space. Subsequently, the downlink data is sent to the terminal again. Therefore, in the case where the terminal fails to correctly receive the downlink data according to the second scheduling information, the terminal can detect the retransmission scheduling information of the downlink data in the first downlink control channel search space.

The first downlink control channel search space for sending the retransmission scheduling information may be configured in at least one of the manners described below.

Manner one: the first downlink control channel search space for sending the retransmission scheduling information is configured through the second scheduling information. That is, the base station sends the second scheduling information to the terminal such that when the terminal receives the downlink data, the first downlink control channel search space for sending the retransmission scheduling information after the downlink data transmission fails is configured in the second scheduling information.

Manner two: the first downlink control channel search space for sending the retransmission scheduling information is configured in the downlink channel indicated by the second scheduling information.

Manner three: the first downlink control channel search space for sending the retransmission scheduling information is configured through uplink transmission configuration information. It is to be understood that when the base station indicates the first downlink control channel search space to the terminal through the uplink transmission configuration information, the base station can configure the first downlink control channel search space through the configuration information of the downlink control channel search space or through other information. Manner four: the first downlink control channel search space for sending the retransmission scheduling information is configured in system information (SI).

Information about a HARQ-ACK of data sent in an uplink channel.

According to the preceding description, the configuration information of the downlink control channel search space can be used for configuring the downlink control channel search space to the terminal. In some examples, the DCI carried in the downlink control channel includes information about a HARQ-ACK of data sent in an uplink channel. The HARQ-ACK information is used for the base station to feed back the reception situation of uplink data by the base station to the terminal. Undoubtedly, the information about a HARQ-ACK may be an acknowledgement (ACK) or a NACK.

In some examples of the embodiment, the base station may represent whether HARQ-ACK is the ACK or the NACK by 1-bit information. For example, in some examples of the embodiment, the information sent by the base station to the terminal includes 4 bits, and the value of the first three bits being "001" represents that the information is the information about a HARQ-ACK. After receiving the information and determining that the information is the information about a HARQ-ACK, the terminal can further determine whether the information about a HARQ-ACK is the ACK or the NACK by analyzing the information of the last bit. Of course, in some other examples of the embodiment, the base station may indicate, to the terminal, whether the information about a HARQ-ACK is the ACK or the NACK through multiple bits.

In some other examples of the embodiment, the base station may represent whether a HARQ-ACK is an ACK or a NACK by a sequence, for example, the base station may represent the ACK by carrying a first sequence in the information about a HARQ-ACK and may indicate that the HARQ-ACK is the NACK by carrying a second sequence in the information about a HARQ-ACK. Here, the first sequence and the second sequence may be configured by the base station or a default configuration may be adopted. In addition, the first sequence may be obtained from sequence spreading of 1-bit ACK information, and the second sequence may be obtained from sequence spreading of 1-bit NACK information.

Uplink transmission power adjustment information:

For uplink transmission power adjustment information, in an example of the embodiment, if the HARQ-ACK in the DCI sent by the base station to the terminal is an ACK, the DCI also includes uplink transmission power adjustment information. The uplink transmission power adjustment information can indicate that the terminal is to adjust a transmit power, so that the transmit power of an uplink transmission on the next available uplink channel resource is obtained. Here, the current transmit power of the terminal is referred to as a "current transmit power" and the transmit power of the uplink transmission on the next available uplink channel resource is referred to as a "target transmit power". Then, the uplink transmission power adjustment information is used for indicating that the terminal is to adjust the current transmit power to obtain the target transmit power.

It is to be understood that the uplink transmission power adjustment information may indicate, in at least one of two manners, that the terminal is to perform transmit power adjustment.

In some examples of the embodiment, the uplink transmission power adjustment information carries an adjustment policy of the transmit power. The adjustment policy is used for indicating that the target transmit power can be obtained if the terminal adjusts the current transmit power.

In an example for reference, the adjustment policy carried in the uplink transmission power adjustment information is a power adjustment value which may be a positive number or a negative number. Undoubtedly, the target transmit power, the current transmit power, and the power adjustment value satisfy the following relationship: target transmit power=current transmit power+power adjustment value.

For example, in one example, the power adjustment value is −3 decibel relative to one milliwatt (dBm), and then the terminal can obtain the target transmit power from the current transmit power plus (−3 dBm) after obtaining the power adjustment value.

In some other examples of the embodiment, the target transmit power value may be directly carried in the uplink transmission power adjustment information, so that when the terminal receives the DCI carrying the uplink transmission power adjustment information sent by the base station, the terminal may directly obtain the target transmit power by analyzing the uplink transmission power adjustment information without performing calculation by the terminal itself.

For first indication information, in some examples of the embodiment, the DCI may include first indication information for indicating that the terminal is to perform at least one of the following operations:

1. sending a random access signal in a random access channel;
2. falling back to a radio resource control (RRC) idle state;
3. exiting an uplink transmission mode configured through the uplink transmission configuration information;
4. releasing an uplink channel resource and/or a search space resource configured through the uplink transmission configuration information; or
5. performing an uplink transmission on a next available uplink channel resource.

It is to be understood that the first indication information may also indicate that the terminal is to perform two or even more of the preceding operations at the same time. For example, in some examples, after the terminal detects the DCI sent by the base station, the terminal determines through analysis that the base station instructs the terminal itself to simultaneously perform operations 2, 3, and 4, and then the terminal can exit the corresponding uplink transmission mode, release the uplink channel resource and/or search space resource configured through the uplink transmission configuration information, and simultaneously fall back to the RRC-idle state.

In the embodiment, when the terminal sends the random access signal in the random access channel according to the indication of the first indication information: if the format of the DCI carrying the first indication information is a first format, the terminal sends the random access signal in the random access channel. The DCI having the first format here refers to the DCI including at least random access configuration information. In some examples, the DCI having the first format may be a physical downlink control channel order (PDCCH order).

In one example of the embodiment, the HARQ-ACK in the DCI received by the terminal is a NACK, and then when the terminal performs an uplink transmission on the next available uplink channel resource according to the indication of the first indication information, the transmitted data may be the data corresponding to the NACK in the DCI or other data.

For uplink grant, in some examples, when the DCI sent by the base station to the terminal includes an uplink grant and a value of at least one field in the uplink grant is a first value set, the DCI indicates that the data sent in the corresponding uplink channel has been correctly received. The field here may refer to an information element (IE). It is to be understood that the first value set may be configured by the base station and then notified to the terminal, or the default configuration may be adopted.

The IE in the UL grant for "indicating that the data sent in the corresponding uplink channel has been correctly received" may be resource allocation information of an uplink transmission. A value in the first value set may be the value corresponding to the invalid resource allocation information of the uplink transmission. For example, in some examples of the embodiment, the values in the first value set include "00", "01", "10", and "11", where "00", "01", and "10" are all valid resource allocation information of the uplink transmission, and merely "11" is the value corresponding to the invalid resource allocation information of the uplink transmission. Then, the base station can indicate, to the terminal by carrying "11" in the UL grant, that the uplink data in the corresponding uplink channel has been correctly received.

In the embodiment, the resource indicated by the UL grant may be used for performing a HARQ retransmission on the uplink data of the preceding uplink transmission and may also be used for transmitting other uplink data. The necessary configuration information for the uplink transmission is included in the UL grant.

For TA update information, in some examples of the embodiment, the DCI includes TA update information. Similar to the case of uplink transmission power adjustment information, when the base station instructs the terminal to adjust a TA, the base station may also instruct the terminal by notifying the terminal of an adjustment value of the TA. However, in the embodiment, the TA adjustment value is not necessarily the variation of the updated TA value relative to the current TA value but the amount of change of the updated TA value relative to a reference TA value. The reference TA value may be the latest saved TA value or the TA value sent in a random access response (RAR). Therefore, in these examples, the TA update information in the DCI may be the amount of change of the updated TA value relative to the reference TA value.

Of course, the base station may also directly notify the terminal of the updated TA value, so in these examples, the TA update information carried in the DCI may be the updated TA value in other examples in the embodiment.

It is to be understood that in some examples of the embodiment, the TA update information may include both the updated TA value and the amount of change of the updated TA value relative to the reference TA value.

After receiving the DCI, the terminal can obtain the updated TA value according to the TA update information in the DCI and save the TA update value for subsequent uplink information sending.

For resource configuration information of the acknowledgement information for the DCI, in one example of the embodiment, if the DCI sent by the base station to the terminal includes at least one of ACK information or TA update information, the terminal will feed back the acknowledgement information for the DCI to the base station after receiving the DCI. The acknowledgement information for the DCI is used by the terminal to notify the base station of whether the DCI sent by the base station is successfully received by the terminal. In order for the terminal to know which resources are used for sending the acknowledgement information for the DCI, in one example of the embodiment, the DCI also includes resource configuration information of the acknowledgement information for the DCI if the DCI includes ACK information and/or TA update information.

It is to be understood that if the DCI sent by the base station to the terminal includes ACK information and/or TA update information, the base station will also receive the acknowledgement information for the DCI, and the base station will receive the acknowledgement information according to the resource configuration information of the acknowledgement information in the DCI.

Figure 3:
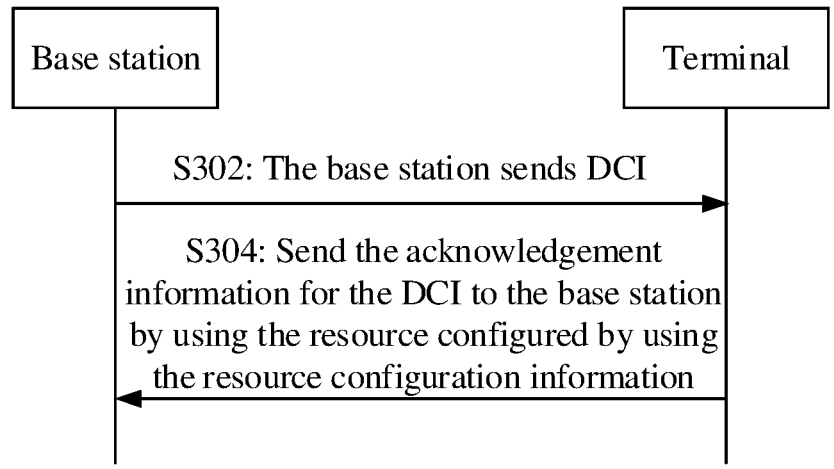
FIG. 3 is a flowchart showing another interaction between a base station and a terminal in an information transmission solution according to embodiment one of the present disclosure.

Referring to a flowchart showing interaction between a terminal and a base station shown in FIG. 3, in S302, the base station sends DCI to the terminal.

In this example, ACK information, TA update information, and resource configuration information of acknowledgement information for the DCI are notified in the DCI information.

In S304, the terminal sends the acknowledgement information for the DCI to the base station by using the resource configured by using the resource configuration information.

In some examples of the embodiment, if the DCI sent by the base station to the terminal includes ACK information and/or TA update information, the terminal will detect the downlink control channel search space in a first time window, where the length of the first time window may be configured by the base station or adopts a default configuration, and the starting time of the first time window may also be configured by the base station or adopts a default configuration. It is to be understood that the length of the first time window and the starting time of the first time window may be configured in different manners. For example, in one example of the embodiment, the length of the first time window is configured by the base station, and a default configuration is adopted for the starting time of the first time window. Of course, in some other examples of the embodiment, the two parameters for the terminal to determine the first time window may also be configured in the same manner, for example, both of the two parameters are configured by the base station or default configurations are adopted for both of the two parameters.

In some other examples of the embodiment, if the DCI sent by the base station to the terminal includes ACK information and/or TA update information, the terminal will continue to detect the downlink control channel search space until the downlink control channel search space times out.

For downlink grant, in some examples of the embodiment, DCI including a downlink grant may be used for indicating that the data sent on the uplink channel corresponding to the DCI has been correctly received. When the terminal receives the DCI, the terminal can determine that the data sent by the terminal itself to the base station through the uplink channel corresponding to the DCI has been correctly received by the base station.

According to the information sending method and the information receiving method provided in the embodiment, the uplink transmission configuration information sent by the base station to the terminal can enable the terminal in an RRC-IDLE state to directly perform an uplink transmission of data, so that a state switching process of the terminal is omitted before the uplink transmission, avoiding signaling interaction caused by the state switching, and naturally reducing power consumption of the terminal and occupation of system resources by the terminal. When the transmission solution is applied to the scenario where frequent data transmission is required or the scenario where periodic uplink transmission is required, the power consumption of the terminal can be significantly reduced, the endurance of the terminal can be prolonged, and the user experience on the terminal side can be enhanced.

Embodiment Two

Figure 4:
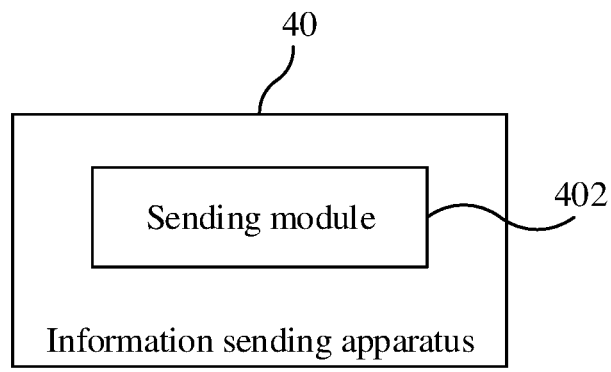
FIG. 4 is a structural diagram of an information sending apparatus according to embodiment two of the present disclosure.

The embodiment provides an information sending apparatus. Referring to FIG. 4, an information sending apparatus 40 may be applied to a base station side and may be deployed on a base station to implement the information sending method described in the preceding embodiment. The information sending apparatus 40 includes a sending module 402 configured to send uplink transmission configuration information by a terminal.

Figure 5:
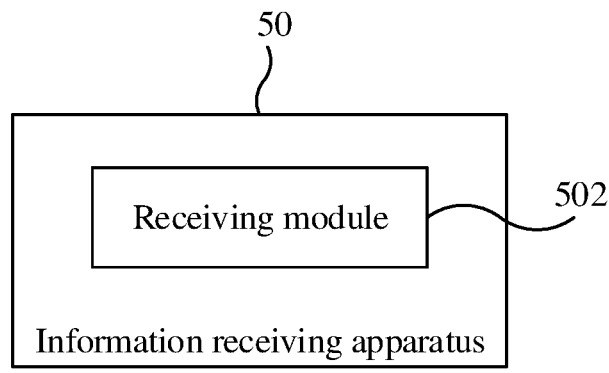
FIG. 5 is a structural diagram of an information receiving apparatus according to embodiment two of the present disclosure.

The embodiment further provides an information receiving apparatus that may be applied to a terminal side. Referring to FIG. 5, the information receiving apparatus 50 includes a receiving module 502 configured to receive uplink transmission configuration information sent by a base station. The information receiving apparatus 50 may be deployed in a terminal to implement the information receiving method described in the preceding embodiment.

In the embodiment, the function of the sending module 402 can be jointly implemented by the processor and communication unit at the base station side, and the function of the receiving module 502 can be jointly implemented by the communication unit and processor of the terminal.

In the embodiment, the uplink transmission configuration information includes at least one of the two following types of information: (1) configuration information of an uplink channel resource; or (2) configuration information of a downlink control channel search space.

In some examples of the embodiment, the uplink transmission configuration information includes merely one of the preceding two types of information, while in some other examples of the embodiment, the uplink transmission configuration information may include both the preceding two types of configuration information. In the embodiment, the uplink transmission configuration information may be used for indicating that the terminal is to perform an uplink transmission in the RRC-CONNECT state or indicating that the terminal is to perform an uplink transmission in the RRC-IDLE state. Therefore, in the embodiment, the terminal does not need to switch from the RRC-IDLE state to the RRC-CONNECT state even if the terminal needs to perform an uplink data transmission in the RRC-IDLE state, avoiding various signaling interactions required in a state switching process, thereby avoiding power consumption and system resource consumption generated by the terminal in a state switching signaling exchange process, and being beneficial to the optimal configuration of terminal resources.

If the uplink transmission configuration information includes the preceding first type of configuration information, that is, the configuration information of the uplink channel resource, the base station can indicate the uplink channel resource to the terminal through the configuration information. The uplink channel configured through the configuration information of the uplink channel resource may be a resource specific to the terminal having received the uplink transmission configuration information. Of course, in some other cases, the uplink channel configured through the configuration information of the uplink channel resource may also be a resource common to a group of terminals (the number of terminals is greater than one).

It is to be understood that uplink channel resources configured through the configuration information of the uplink channel resources can be continuously distributed or discretely distributed, for example, periodically distributed, in the time domain.

If the uplink transmission configuration information includes the preceding second type of configuration information, that is, the configuration information of the downlink control channel search space, the configuration information can indicate the downlink control channel search space to the terminal.

In the embodiment, the configuration information of the downlink control channel search space includes at least one of the following: (1) time domain position information of the downlink control channel search space; (2) frequency domain position information of the downlink control channel search space; or (3) distribution information of downlink control channels in the downlink control channel search space.

Downlink control channel search spaces configured through the configuration information of the downlink control channel search spaces may be continuously distributed or discretely distributed, for example, periodically distributed, in the time domain.

When the uplink channel configured through the configuration information of the uplink channel resource is a resource dedicated to a certain terminal, the downlink control channel search space configured through the configuration information of the downlink control channel search space is also dedicated to the terminal. Correspondingly, when the uplink channel configured through the configuration information of the uplink channel resource is a resource common to a group of terminals, the downlink control channel search space configured through the configuration information of the downlink control channel search space is also common to the group of terminals.

In addition, in the embodiment, one downlink control channel search space corresponds to at least one uplink channel, and in some examples, each uplink channel resource corresponds to one downlink control channel search space. It is to be understood that the information carried in the downlink channel of the downlink control channel search space includes DCI. In some examples, the DCI may include at least one of the following types of information: first scheduling information; second scheduling information; information about a HARQ-ACK of data sent in an uplink channel; uplink transmission power adjustment information; first indication information; uplink grant; TA update information; resource configuration information of the acknowledgement information for the DCI; or a downlink grant.

For details of how the information sending apparatus 40 implements the information sending method described in embodiment one and details of how the information receiving apparatus 50 implements the information receiving method described in embodiment one, reference may be made to the description of embodiment one, and repetition is not made here.

It is to be understood that in other examples of the embodiment, the information sending apparatus 40 may also include a receiving module configured to receive information sent by the terminal. The information receiving apparatus 50 may also include a sending module configured to send information to the base station.

According to the information sending apparatus and the information receiving apparatus provided in the embodiment, the uplink transmission configuration information sent by the base station to the terminal can enable the terminal in an RRC-IDLE state to directly perform an uplink transmission of data, so that a state switching process of the terminal is omitted before the uplink transmission, avoiding signaling interaction caused by the state switching, and naturally reducing power consumption of the terminal and occupation of system resources by the terminal. When the transmission solution is applied to the scenario where frequent data transmission is required or the scenario where periodic uplink transmission is required, the power consumption of the terminal can be significantly reduced, the endurance of the terminal can be prolonged, and the user experience on the terminal side can be enhanced.

Embodiment Three

The information transmission scheme continues to be described in the embodiment in conjunction with examples in order to enable those skilled in the art to better understand the advantages and details of the preceding information sending method and information receiving method.

In a wireless communication system, a base station sends uplink transmission configuration information to a terminal (e.g., UE). The uplink channel configuration information includes: configuration information of an uplink channel resource; and configuration information of a downlink control channel search space.

In the embodiment, the uplink transmission configuration information may support the data transmission of the UE in the RRC-IDLE state.

Figure 6:
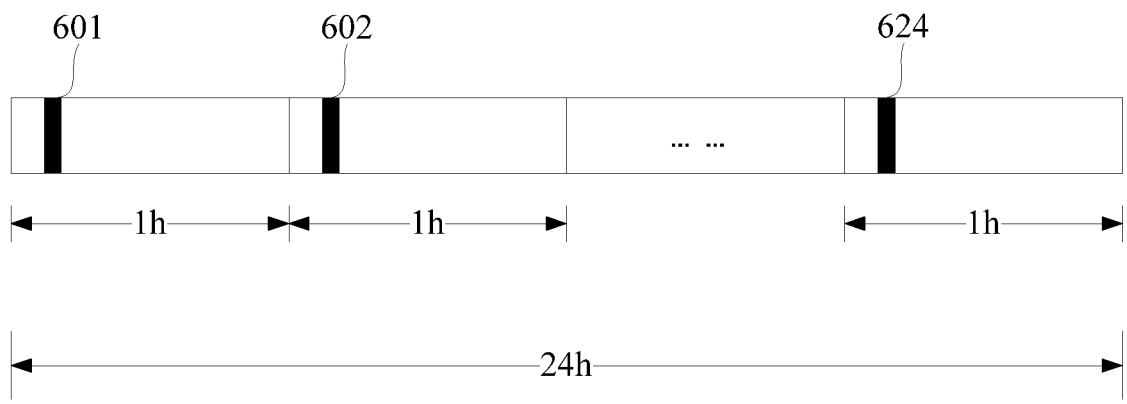
FIG. 6 is a diagram showing an uplink channel resource indicated by configuration information of an uplink channel resource according to embodiment three of the present disclosure.

The configuration information of the uplink channel resource indicates the position information of a group of uplink channel resources. As shown in FIG. 6, the configuration period of an uplink channel resource is one hour, and the amount of offset of the time domain position of the uplink channel resource within the configuration period is 10 minutes. FIG. 6 a diagram showing the positions of 24 uplink channel resources within 24 hours; the 24 uplink channel resources are an uplink channel resource 601, an uplink channel resource 602, . . . , an uplink channel resource 624.

Figure 7:
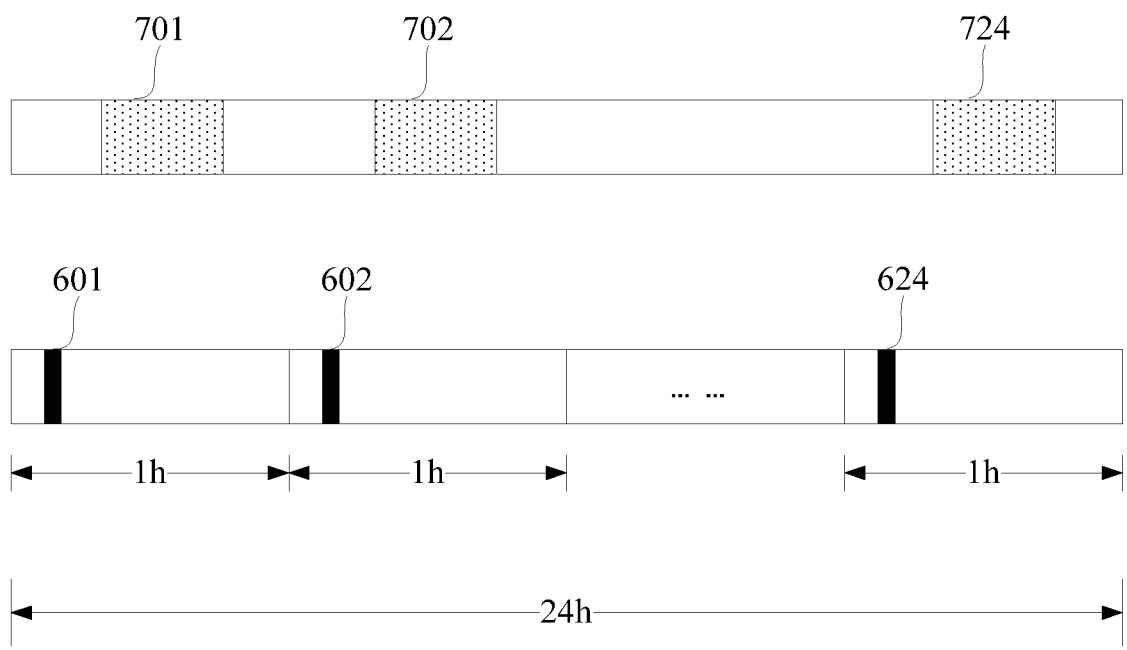
FIG. 7 is a diagram showing a relationship between a search space indicated by configuration information of a downlink control channel search space and an uplink channel resource indicated by configuration information of an uplink channel resource according to embodiment three of the present disclosure.

In the embodiment, the base station configures a terminal-specific downlink control channel search space for the terminal through the configuration information of the downlink control channel search space, and the search space includes at least one sending resource set (also referred to as sending opportunity) of a downlink control channel. The DCI is carried on the downlink control channel and sent. Each uplink channel resource corresponds to one downlink control channel search space. As shown in FIG. 7, the uplink channel resource 601 corresponds to a search space 701, the uplink channel resource 602 corresponds to a search space 702, . . . , and the uplink channel resource 624 corresponds to a search space 724. In the embodiment, a time domain interval exists between the starting time of a search space and the end time of the uplink channel resource corresponding to the search space. For example, a certain time domain interval exists between the end time of the uplink channel resource 601 and the starting time of the search space 701. Here, the time domain interval between the end time of the uplink channel resource 601 and the starting time of the search space 701 is defined as time domain interval 1, and so on, and the time domain interval between the end time of the uplink channel resource 624 and the starting time of the search space 724 may be defined as time domain interval 24.

Example One

Figure 8:
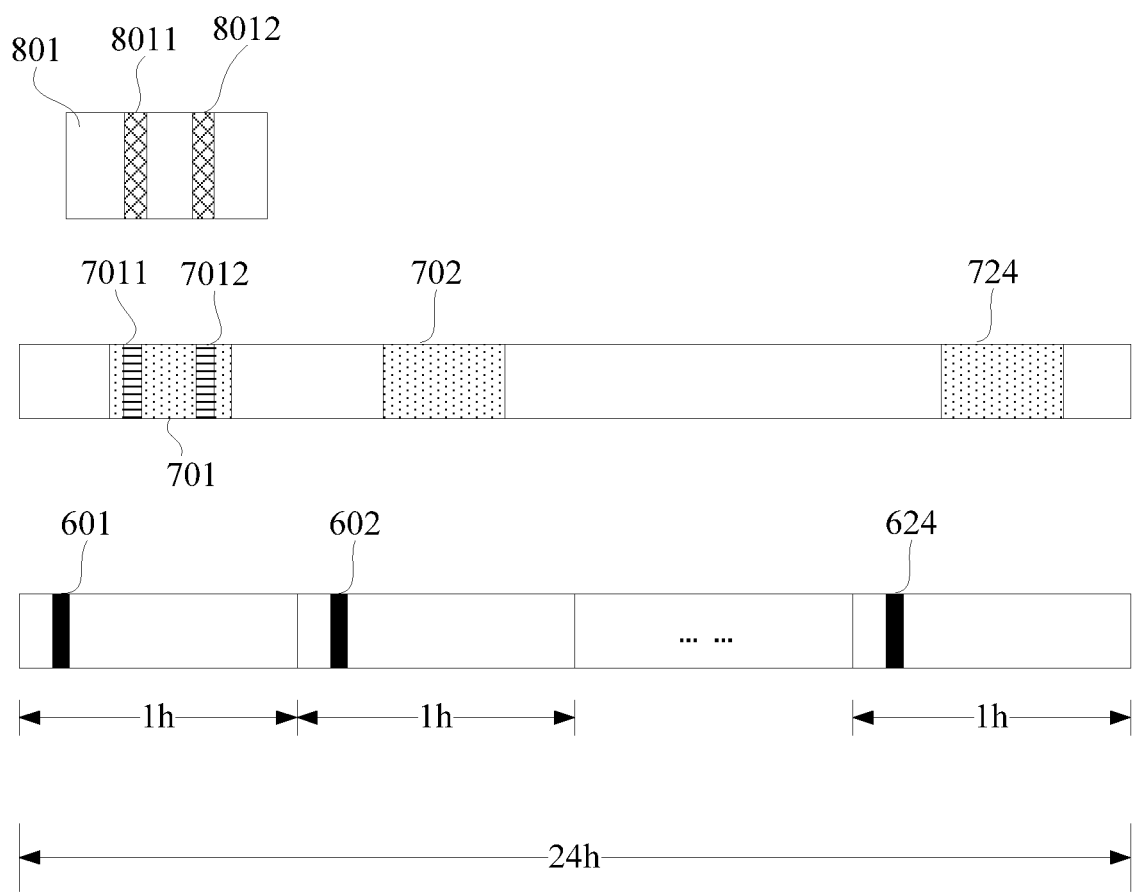
FIG. 8 is a diagram showing a positional relationship between a paging occasion in a paging transmission window and a sending opportunity in a search space shown in example one according to embodiment three of the present disclosure.

In this example, the time domain position of a paging transmission window 801 where the base station sends paging information is shown in FIG. 8, and the PTW includes two paging occasions (POs), that is, a paging occasion 8011 and a paging occasion 8012. Two downlink control channel sending opportunities exist in the search space 701, that is, a sending opportunity 7011 and a sending opportunity 7012. The time domain position of the paging transmission window 8011 overlaps the time domain position of the search space 701, and the paging occasion 8012 overlaps the sending opportunity 7012.

In this example, in a case where a PO in the PTW at least partially overlaps a downlink control channel of the downlink control channel search space, the base station does not send a paging message on the PO; in a case where a PO in the PTW does not overlap a corresponding downlink control channel of the downlink control channel search space, the base station sends a paging message on the PO. Therefore, the base station does not send paging on the paging occasion 8012, but the base station can send paging on the paging occasion 8011 and send paging on the sending opportunity 7012 in the search space 701. The terminal also attempts to receive the paging on the on the paging occasion 8011 and the sending opportunity 7012.

Example Two

Figure 9:
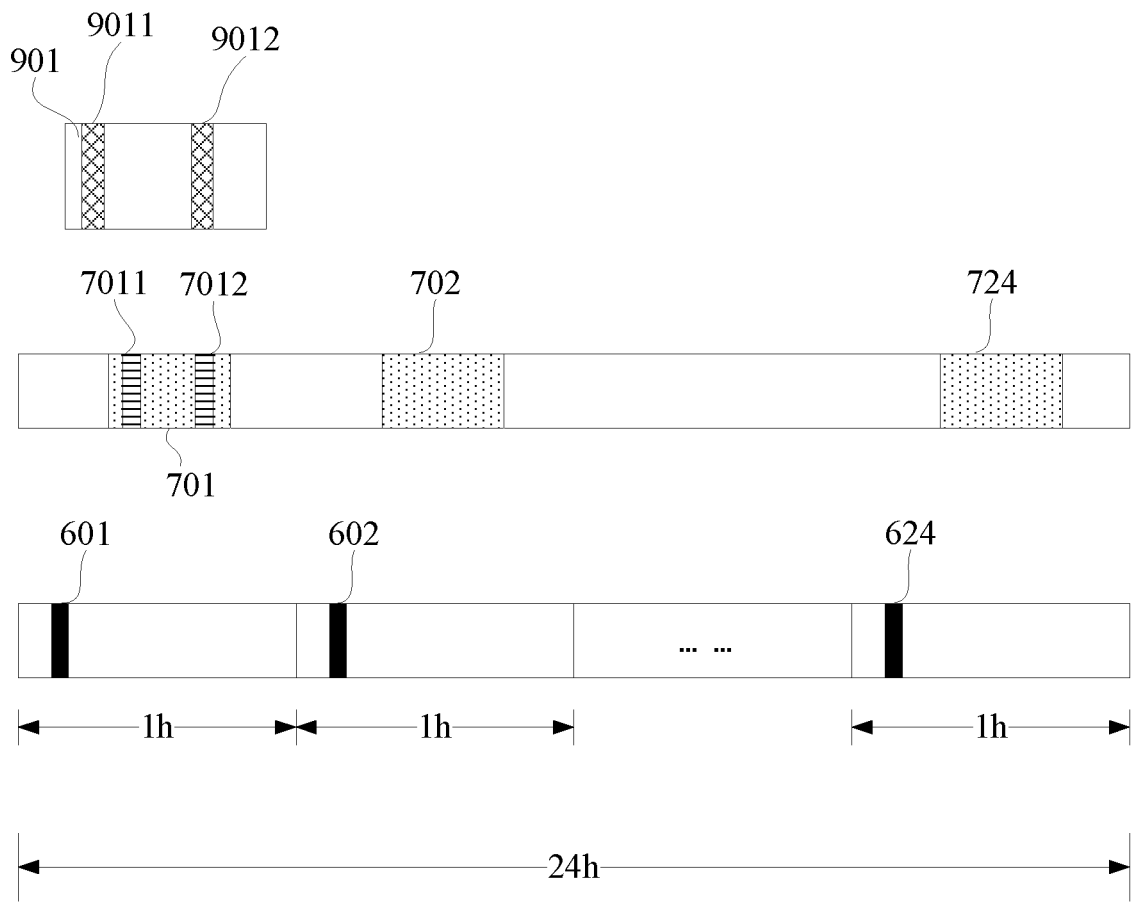
FIG. 9 is a diagram showing a positional relationship between a paging occasion in a paging transmission window and a sending opportunity in a search space shown in example two according to embodiment three of the present disclosure.

In this example, the time domain position of the paging transmission window where the base station sends paging information is shown in FIG. 9, and a paging transmission window 901 includes two paging occasions (POs), that is, a paging occasion 9011 and a paging occasion 9012. Two downlink control channel sending opportunities exist in the search space 701, that is, a sending opportunity 7011 and a sending opportunity 7012. The time domain position of the paging transmission window 901 overlaps the time domain position of the search space 701, the time domain interval between the paging occasion 9011 and the sending opportunity 7011 is D, and D is less than or equal to a threshold T configured by the base station (assuming that the threshold T is the first threshold). It is to be understood by those skilled in the art that the default configuration may also be adopted for the value of the threshold T. The paging occasion 9012 partially overlaps the sending opportunity 7012.

In this example, in a case where a PO in the PTW at least partially overlaps a downlink control channel of the downlink control channel search space, the base station does not send a paging message on the PO; in a case where a time domain interval between a PO in the PTW and a downlink control channel of the downlink control channel search space is less than or equal to a first threshold, the base station does not send a paging message on the PO. Since the time domain interval D between the paging occasion 9011 and the sending opportunity 7011 is less than or equal to T, the base station does not send paging on the paging occasion 9011 but sends paging on the sending opportunity 7011. Since the paging occasion 9012 partially overlaps the sending opportunity 7012, the base station does not send paging on the paging occasion 9012 but chooses to send paging on the sending opportunity 7012. Correspondingly, the terminal attempts to receive paging on the sending opportunity 7011 and sending opportunity 7012 corresponding to the paging transmission window 901.

Embodiment Four

The embodiment provides a storage medium. The storage medium may store one or more computer programs that can be read, compiled and executed by one or more processors. In the embodiment, the storage medium may store one of an information sending program or an information receiving program. The information sending program may be executed by one or more processors to implement any information sending method described in the preceding embodiment. The information receiving program may be executed by one or more processors to implement any information receiving method described in the preceding embodiment.

Figure 10:
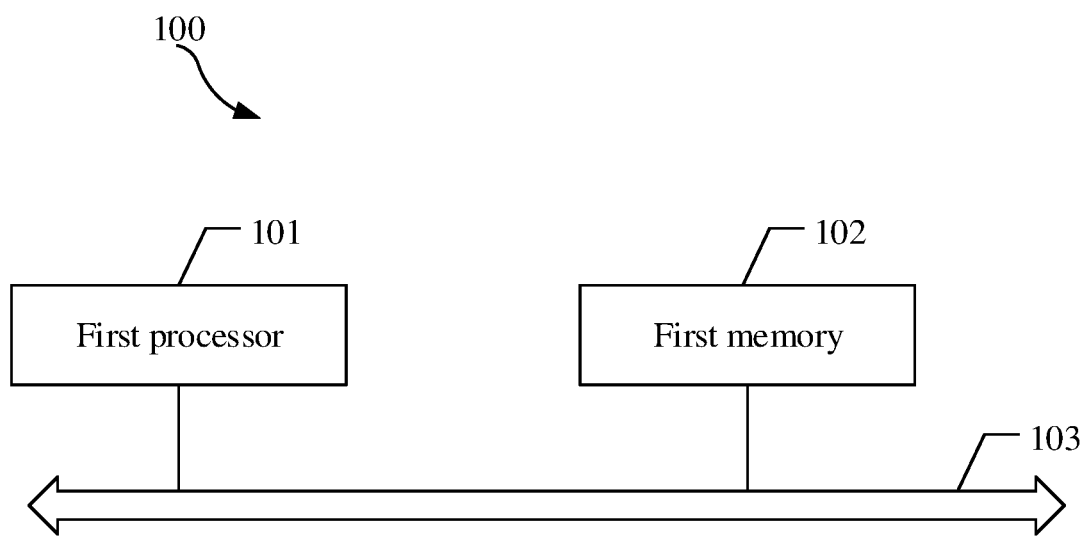
FIG. 10 is a structural diagram illustrating hardware of a base station according to embodiment four of the present disclosure.

The embodiment further provides a base station. As shown in FIG. 10, a base station 100 includes a first processor 101, a first memory 102, and a first communication bus 103 used for connecting the first processor 101 and the first memory 102. The first memory 102 may be a storage medium on which the information sending program is stored. The first processor 101 may read and compile the information sending program and execute the steps of the information sending method described in the preceding embodiment. For details of implementation of the information sending method by the base station 100, reference may be made to the description of the preceding embodiment. Repetition is not made here.

Figure 11:
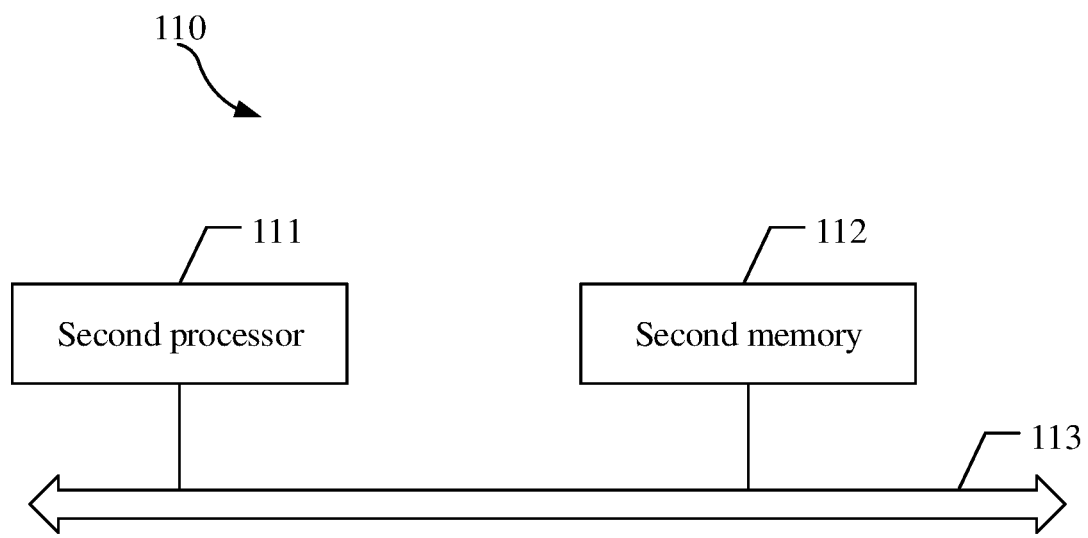
FIG. 11 is a structural diagram illustrating hardware of a terminal according to embodiment four of the present disclosure.

The embodiment further provides a terminal. As shown in FIG. 11, a terminal 110 includes a second processor 111, a second memory 112, and a second communication bus 113 used for connecting the second processor 111 and the second memory 112. The second memory 112 may be a storage medium on which the information receiving program is stored. The second processor 111 may read and compile the information receiving program and execute the steps of the information receiving method described in the preceding embodiment. For details of implementation of the information receiving method by the terminal 110, reference may be made to the description of the preceding embodiment. Repetition is not made here.

Figure 12:
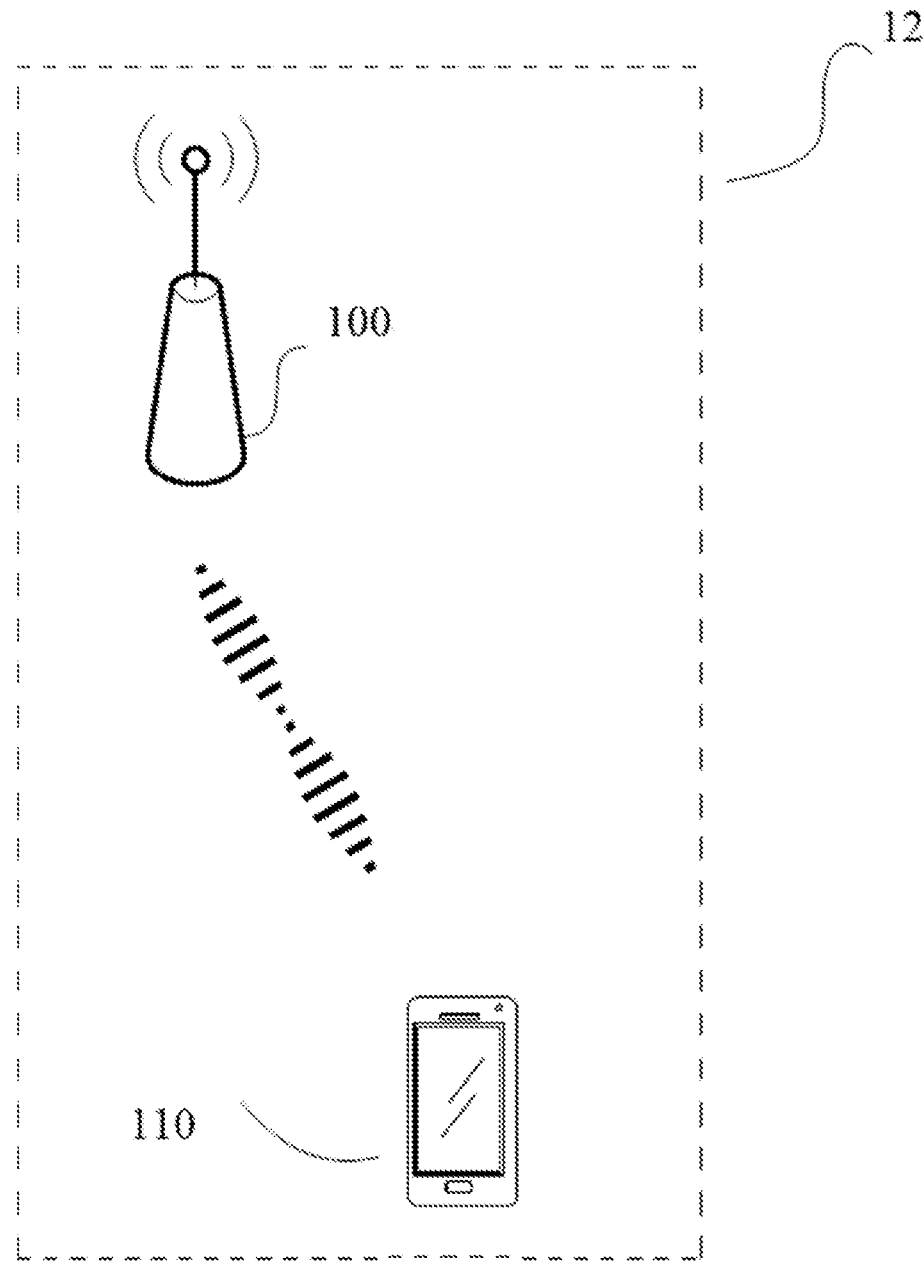
FIG. 12 is a diagram showing structures of a communication system according to embodiment four of the present disclosure.

The embodiment further provides a communication system. Referring to FIG. 12, a communication system 12 includes a base station 100 and a terminal 110. In some examples of the embodiment, the communication system 12 includes one base station 100 and multiple terminals 110. In some other examples of the embodiment, the communication system 12 may include more than one base station 100.

The communication system provided in the embodiment may be applied to the scenario where long-term standby and periodic uplink data transmission are required, such as the scenario of the Internet of Things, avoiding RRC state switching during data transmission, reducing signaling interaction, significantly reducing power consumption of the terminal, and prolonging endurance of the terminal.

It is to be understood by those skilled in the art that the information sending method and apparatus, the information receiving method and apparatus, the terminal, the base station, the communication system and the storage medium provided in various embodiments of the present application can be applied not only to existing communication systems and 5G communication systems currently being deployed but also to any future communication system.

In the present application, if not in collision, the features of the various embodiments may be combined with each other and used in the same embodiment.

Apparently, those skilled in the art should understand that functional modules/units in all or part of the system, the apparatuses and the steps of the methods disclosed above may be implemented as software (which may be implemented as program codes executable by a computing apparatus), firmware, hardware, and appropriate combinations thereof. In the hardware implementation, the division of the preceding functional modules/units may not correspond to the division of physical components. For example, one physical component may have multiple functions, or one function or step may be performed jointly by several physical components. Some or all physical components may be implemented as software executed by a processor such as a central processing unit, a digital signal processor, or a microprocessor, may be implemented as hardware, or may be implemented as integrated circuits such as application-specific integrated circuits. Such software may be distributed on a computer-readable medium and executed by a computing apparatus. Moreover, in some cases, the steps illustrated or described herein may be performed in a sequence different from the sequence described herein. The computer-readable medium may include a computer storage medium (or a non-transitory medium) and a communication medium (or a transitory medium).

As is known to those having ordinary skill in the art, the term computer storage media include volatile and nonvolatile media and removable and non-removable media implemented in any method or technology for storing information (such as computer-readable instructions, data structures, program modules or other data). The computer storage medium includes, but is not limited to, a random access memory (RAM), a read-only memory (ROM), an electrically erasable programmable read-only memory (EEPROM), a flash memory or another memory technology, a compact disc read-only memory (CD-ROM), a digital video disc (DVD) or another optical disc storage, a magnetic cassette, a magnetic tape, disk storage or another magnetic storage apparatus, or any other medium used to store the desired information and accessible by a computer. Moreover, as is known to those having ordinary skill in the art, communication media generally include computer-readable instructions, data structures, program modules or other data in carriers or in modulated data signals transported in other transport mechanisms and may include any information delivery medium. Therefore, the present application is not limited to any particular combination of hardware and software.

The above is a more detailed description of embodiments of the present disclosure in conjunction with implementations and is not to be construed as limiting embodiments of the present application. For those having ordinary skill in the art to which the present application pertains, simple deductions or substitutions may be made without departing from the concept of the present application and are considered to fall within the scope of the present application.

What is claimed is:

1. A method of wireless communication, comprising:
    sending, by a base station to a terminal, uplink transmission configuration information comprising configuration information of an uplink channel resource and configuration information of a downlink control channel search space,
    wherein information carried in a downlink control channel of the downlink control channel search space comprises downlink control information (DCI),
    wherein the DCI indicates a hybrid automatic repeat request-acknowledgement (HARQ-ACK) of data sent in an uplink channel,
    wherein the DCI further indicates a variation of an updated TA value relative to a reference TA value,
    wherein the method further comprises:
    upon satisfying a first condition that a timing advance (TA) of the terminal is in a valid state, in a case where a paging occasion (PO) at least partially overlaps the downlink control channel search space, skipping sending a paging message on the PO.

2. The method of claim 1, further comprising:
    sending, in the downlink control channel search space, scheduling information for scheduling a downlink data transmission, the scheduling information scrambled by a terminal-specific radio network temporary identifier (RNTI).

3. A method of wireless communication, comprising:
    receiving, by a terminal from a base station, uplink transmission configuration information comprising configuration information of an uplink channel resource and configuration information of a downlink control channel search space,
    wherein information carried in a downlink control channel of the downlink control channel search space comprises downlink control information (DCI),
    wherein the DCI indicates a hybrid automatic repeat request-acknowledgement (HARQ-ACK) of data sent in an uplink channel, and
    wherein the DCI further indicates a variation of an updated TA value relative to a reference TA value,
    wherein the method further comprises: upon satisfying a first condition that a timing advance (TA) of the terminal is in a valid state, in a case where a paging occasion (PO) at least partially overlaps the downlink control channel search space, skipping detecting a paging message on the PO.

4. The method of claim 3, further comprising:
    detecting, in the downlink control channel search space, scheduling information for scheduling a downlink data transmission, the scheduling information scrambled by a terminal-specific radio network temporary identifier (RNTI).

5. A wireless communications apparatus comprising a processor and a memory, wherein the processor is configured to implement a method comprising:
   sending, by a base station to a terminal, uplink transmission configuration information comprising configuration information of an uplink channel resource, and configuration information of a downlink control channel search space,
   wherein information carried in a downlink control channel of the downlink control channel search space comprises downlink control information (DCI), and
   wherein the DCI indicates a hybrid automatic repeat request-acknowledgement (HARQ-ACK) of data sent in an uplink channel, and
   wherein the DCI further indicates a variation of an updated TA value relative to a reference TA value,
   wherein the method further comprises: upon satisfying a first condition that a timing advance (TA) of the terminal is in a valid state, in a case where a paging occasion (PO) at least partially overlaps the downlink control channel search space, skipping sending a paging message on the PO.

6. The wireless communications apparatus of claim 5, wherein the method further comprises, sending, in the downlink control channel search space, scheduling information for scheduling a downlink data transmission, the scheduling information scrambled by a terminal-specific radio network temporary identifier (RNTI).

7. A wireless communications apparatus comprising a processor and a memory, wherein the processor is configured to implement a method comprising:
   receiving, by a terminal from a base station, uplink transmission configuration information comprising configuration information of an uplink channel resource and configuration information of a downlink control channel search space,
   wherein information carried in a downlink control channel of the downlink control channel search space comprises downlink control information (DCI), and
   wherein the DCI indicates a hybrid automatic repeat request-acknowledgement (HARQ-ACK) of data sent in an uplink channel, and
   wherein the DCI further indicates a variation of an updated TA value relative to a reference TA value, and
   wherein the method further comprises: upon satisfying a first condition that a timing advance (TA) of the terminal is in a valid state, in a case where a paging occasion (PO) at least partially overlaps the downlink control channel search space, skipping detecting a paging message on the PO.

8. The wireless communications apparatus of claim 7, wherein the method further comprises, detecting, in the downlink control channel search space, scheduling information for scheduling a downlink data transmission, the scheduling information scrambled by a terminal-specific radio network temporary identifier (RNTI).

* * * * *